Patented May 16, 1950

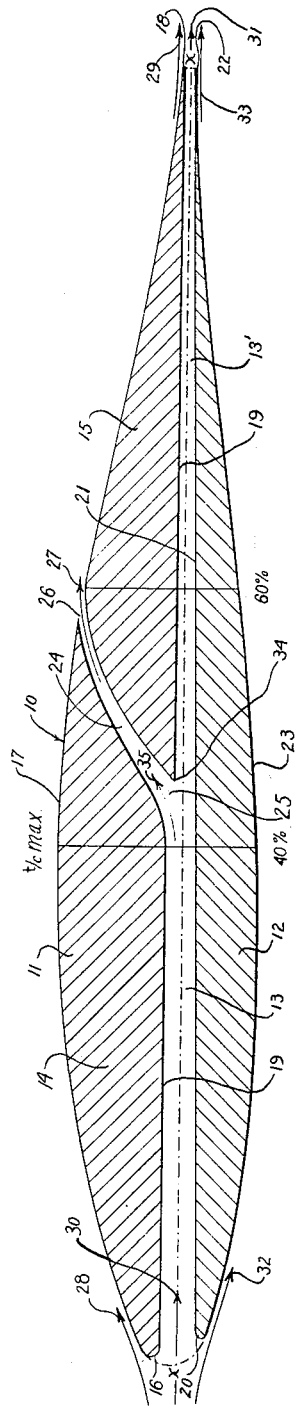

2,507,611

UNITED STATES PATENT OFFICE 2,507,611

HIGH-SPEED AIRFOIL

Costas E. Pappas, Babylon, and Hoshen R. Lu, New York, N. Y., assignors to Republic Aviation Corporation, near Farmingdale, N. Y., a corporation of Delaware Application July 5, 1946, Serial No. 681,468

5 Claims. (Cl. 244—40)

This invention relates to airfoils suitable for high speed airplanes and contemplates a construction wherein the critical Mach number is increased without an appreciable attendant increase in drag.

To that end the present airfoil proposes the reduction or relief of the crowding effect or congestion of the air particles following or flowing over the upper surface of the airfoil, which has, in the prior conventional high speed airfoils, resulted in shock waves and turbulence aft thereof at lower speeds than herein contemplated.

The instant invention also has in view a pressure distribution over the upper surface of the airfoil more nearly approaching the ideal distribution than has heretofore been considered possible.

With the above and other objects in view, as will be apparent, this invention consists in the construction, combination and arrangement of features, all as hereinafter more fully described, claimed and illustrated in the accompanying drawing, wherein is schematically disclosed an airfoil section or profile illustrating one adaptation in accordance with the teachings hereof.

It has been seriously advanced that the maximum speed possible with the conventional high speed airfoil of the prior art has been attained or at least is rapidly approaching attainment. For example, the limit critical Mach number that can be expected for a 12% airfoil is in the neighborhood of 0.85 at a low value of the lift coefficient, i. e. $C_L=0.1$. Therefore to realize the Mach numbers greater than 0.85 in a 12% airfoil the present airfoil is proposed.

In the conventional high speed airfoil heretofore employed the air particles flowing over or following the upper surface tend to congest or crowd producing a shock wave and turbulence aft thereof. By relieving this crowding effect or congestion through causing an appreciable portion of the air stream to flow from the leading edge through the airfoil section along the line of the chord to be discharged at and/or adjacent the trailing edge, it is proposed to increase the critical Mach number without increasing the drag.

The ideal type or pattern of pressure distribution is rectangular or normal to the chord of the airfoil and presents a condition impossible of attainment or even approximation with the presently employed airfoil sections or profiles. By causing a flow of air from the leading edge through the body of the airfoil for discharge at two points, viz: the trailing edge and through the upper surface of the airfoil aft of the maximum thickness, the present airfoil more nearly attains a rectangular pressure distribution pattern than has heretofore been possible.

An airfoil construction in accordance with the teachings of the present invention is illustrated in the drawing and comprises an upper generally convex surface 17 terminating forward in the leading edge 16 and aft in the trailing edge 18; and the lower or under generally convex surface 23 having a leading edge 20 and a trailing edge 22.

This airfoil at and along the chord $x-x$ is divided by a fore and aft passage or duct 13 into an upper section 14 outwardly defined by the upper airfoil surface 17 and inwardly by the upper side 19 of the passage or duct 13 and a lower section 12 outwardly defined by the lower or under airfoil surface 23 and inwardly by the lower side 21 of the passage or duct 13. The duct or conduit 13 extends completely through the airfoil chordwise and may be approximately co-extensive with the airfoil spanwise. Thus the airfoil, regardless of its specific details of construction or conformation, is separated by the passage or conduit 13, which may be said to generally coincide with the chord $x-x$ of the airfoil, into two sections 12 and 14, the outer surfaces of which combine to create the envelope of the airfoil.

While the particular airfoil shape or profile forms no specific part of the present invention, it has been determined that the best results will probably be obtained from a profile which embodies the well-known principle that the maximum thickness should be situated as far aft as possible for high speed operation. Thus with any profile regardless of its specific shape and form, by following the precepts of the present invention it will be possible to position or locate the maximum thickness of the airfoil further aft than heretofore possible without increasing the drag. This advantage is obtained by causing an appreciable part of the air stream at the leading edge of the airfoil to pass between the leading edges 16 and 20 respectively of the airfoil sections 14 and 12 and into the continuous passage 13—13' between these sections for ultimate discharge, at least in part, between the trailing edges 18 and 22 of these airfoil sections.

Aft of the maximum thickness of the airfoil, the upper section 14 is traversed by a rearwardly curved and upwardly or outwardly extending auxiliary passage or duct 24 having a relatively large inlet throat 25 at the point where it joins the main passage or duct 13—13'. This auxiliary conduit 24 extends upwardly and rearwardly through the upper section 14 of the airfoil to terminate and pierce, as at the slot 26, the upper surface 17 of the airfoil and is so curved that it merges tangentially with the upper surface 17. Aft of the extremity of the auxiliary passage 24 the outer surfaces of the afterbody 15 converge sharply and can, if desired, be somewhat concaved thereby producing relatively sharp trailing edges 18 and 22 for the upper and lower airfoil sections 12—14.

It will be noted that the area of the opening or slot between the leading edges 16 and 20 respectively of the sections 14 and 12 greatly exceeds the area of the slot or opening between the trailing edges 18 and 22 respectively of the sections 14 and 12. To establish a confined and direct communication between these slots the passage or conduit 13—13' generally tapers from the leading toward the trailing edge, the taper of the forward portion 13 thereof being relatively minor and that of the portion 13' aft of the throat or inlet 25 of the auxiliary conduit 24 being more pronounced.

It will be noticed also that the width of that part 13' of the passage 13 lying aft of the throat or inlet 25 of the auxiliary passage 24 is further reduced, so that a baffle 34 is created at the junction between the reduced portion 13' of the passage 13 with the inner extremity of the auxiliary passage 24.

Should the aft portion 13' of the passage or duct 13 be of substantially the same cross-sectional area as that of the fore portion, the passage of the air from between the leading edges 16—20 through the passage 13—13' might result in internal draft or aspirator effect in the auxiliary passage 24 causing an inward flow of the upper air stream 28—29 rather than an outward air flow from the passage 24 to join the upper air stream. The reduction of the cross-sectional area of the aft portion 13' of the chordwise conduit or passage creates the baffle 34 to project into the air stream flowing through the passage 13 and direct a portion thereof through the throat or inlet 25, the auxiliary passage 24 and the slot 26 in the upper surface 17 of the airfoil. The undeflected portion of the air flowing between the leading edges 16 and 20 flows through the passage 13 and into the reduced aft portion or extension 13' to be discharged or exhausted as at 31, between the trailing edges 18—22 of the airfoil.

That portion of the air flowing through the passage 13 which is deflected through the auxiliary passage or duct 24 and emitted through the slot 26 in the upper surface 17 joins or unites with the upper air stream 28—29 flowing over or following the contour of said upper airfoil surface 17 for ultimate delivery, as at 29, at the trailing edge 18—22 where it merges or unites with the air stream 32—33 flowing under or following the lower surface 23. The remainder of the air flowing through the chordwise passage 13—13' attains an exit velocity at the trailing edge 18—22 in excess of the entrance velocity of the air stream 30 or any local velocity of the upper air stream 28—29 or of the lower air stream 32—33. Thus the air stream 31 discharged from between the trailing edges 18—22 of the airfoil sections 14—12 produces an induction effect that not only tends to reduce turbulence at the trailing edge and the drag resulting therefrom but acts directly upon the upper air stream 29 and the lower air stream 33. By providing two exits, viz: the slot 26 and the space between the trailing edges 18—22 for the escape or ejection of the air from the passage 13—13', rectangular pressure distribution is more nearly approached than has been hitherto possible.

The exhaust or escape of the air from the aft portion 13' of the passage or conduit 13—13' at the trailing edge of the airfoil produces a boundary layer of control by virtue of the action of the air stream 31 from the passage 13' upon any air which has accumulated on the upper and lower airfoil surfaces 17—23 adjoining the trailing edge 18—22. As above pointed out the air flow 31 from between the trailing edges 18 and 22 of the sections 14—12 has a greater exit velocity than the local velocity of the air stream 29 and 33 at the trailing edge 18—22 of the airfoil and this velocity acts directly upon the air flow over the upper and lower surfaces 17—23 in that it tends to increase the velocity thereof and therefore prevents any congestion and crowding effect in the air streams 29 and 33 travelling over or following the upper and lower airfoil surfaces 17 and 23 at or adjoining the trailing edges 18 and 22.

What is claimed is:

1. An airfoil having an intake opening at its leading edge and a smaller outlet opening at its trailing edge together with an auxiliary opening in its upper surface aft of its maximum thickness, a constantly open main duct situated on the chord of the airfoil and connecting the aforesaid intake and outlet openings, and a constantly open auxiliary duct extending outwardly and curving aftwardly from the main duct at or aft of the maximum thickness of the airfoil to connect with the auxiliary opening in the upper surface of the airfoil, the main duct tapering from the inlet opening to the outlet opening with an increase of its taper aft of the entrance to the auxiliary duct, and the auxiliary duct having a gradually decreasing cross-sectional area as it approaches the auxiliary opening in the upper surface of the airfoil.

2. An airfoil having spanwise slots at its leading and trailing edges, the slot at the trailing edge having a width less than the width of the slot at the leading edge, and a slot in its upper surface aft of its maximum thickness, a duct system, confined entirely within the limits of the airfoil, connecting said slots, comprising an aftwardly tapering main duct situated approximately on the chord of the airfoil connecting the slots at the leading and trailing edges thereof, and an auxiliary duct connecting the main duct aft of the maximum thickness of the airfoil with the slot located in the upper surface of the airfoil, said auxiliary duct having a throat of larger area than the area of the slot in the upper surface of the airfoil communicating with the main duct and tapering gradually from the main duct toward and communicating with the slot in the upper surface of the airfoil.

3. An airfoil having spanwise slots at its leading and trailing edges with the slot at the trailing edge narrower than the slot at the leading edge and a slot in its upper surface aft of its maximum thickness, a duct system connecting said slots comprising a main duct, situated approximately on the chord of the airfoil, connecting the slots at the leading and trailing edges, an auxiliary duct having a relatively wide throat at its inner end communicating with the main duct aft of the maximum thickness of the airfoil and tapering upwardly and aftwardly from the main duct to communicate with the slot of the upper surface of the airfoil, the main duct having a gradual rearward taper forward of the maximum thickness of the airfoil and a more pronounced rearward taper aft of said maximum thickness.

4. An airfoil having spanwise slots at its leading and trailing edges with the slot at the trailing edge narrower than the slot at the leading edge and a slot in its upper surface aft of the maximum thickness of the airfoil, a duct system connecting said slots comprising a main duct, connecting the slots at the leading and trailing edges, an auxiliary duct connecting the main duct with the slot in the upper surface of the airfoil, said auxiliary duct having a throat at its inner end communicating with the main duct aft of the maximum thickness of the airfoil of greater area than the area of the slot in the upper surface of the airfoil and tapering upwardly and curving aftwardly from the main duct to communicate with said slot of the upper surface of the airfoil, the main duct having a gradual rearward taper forward of the maximum thickness and a more pronounced rearward taper and less width aft of the maximum thickness, thereby creating a projecting baffle where the upper wall of the main duct joins the aft wall of the auxiliary duct.

5. An airfoil having open and unobstructed spanwise slots at its leading and trailing edges and in its upper surface aft of its maximum thickness, the slot at the leading edge being wider than the slot at the trailing edge, a constantly open duct system connecting said slots comprising a main duct tapering aftward from the slot at the leading edge to the slot at the trailing edge, the taper of said duct being greater and the width thereof less aft of the maximum thickness of the airfoil than forward thereof, and an auxiliary duct connecting the main duct at or aft of the maximum thickness of the airfoil with the slot in the upper surface of the airfoil, said auxiliary duct having an area where it joins the main duct greater than the area of the slot in the upper surface thereof, and tapering and curving upwardly and aftwardly from the main duct to said slot in the upper surface of the airfoil.

COSTAS E. PAPPAS.
HOSHEN R. LU.

REFERENCES CITED

The following references are of record in the file of this patent:

UNITED STATES PATENTS

| Number | Name | Date |
| --- | --- | --- |
| 1,559,091 | Hall | Oct. 27, 1925 |
| 1,810,693 | Alfaro | June 16, 1931 |
| 2,078,854 | Jones | Apr. 27, 1937 |
| 2,136,403 | Vance | Nov. 15, 1938 |
| 2,267,927 | Kightlinger | Dec. 30, 1941 |
| 2,352,144 | Woods | June 20, 1944 |

FOREIGN PATENTS

| Number | Country | Date |
| --- | --- | --- |
| 738,478 | France | Oct. 17, 1932 |

OTHER REFERENCES

"Flight" (Pub.), Nov. 4, 1937, p. 450. (Copy in Div. 22.)

"Air Trails" (Pub.), Mar. 1944. (Copy in Div. 22.)